(12) United States Patent
Ray et al.

(10) Patent No.: US 9,860,722 B1
(45) Date of Patent: Jan. 2, 2018

(54) CONVERTING LOCATION INFORMATION INTO PUBLIC SAFETY ANSWERING POINT (PSAP) SIGNALING

(71) Applicant: Sprint Communications Company L.P., Overland Park, KS (US)

(72) Inventors: Amar Nath Ray, Shawnee, KS (US); Tracy Lee Nelson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 376 days.

(21) Appl. No.: 14/168,755

(22) Filed: Jan. 30, 2014

(51) Int. Cl.
  *H04L 12/16* (2006.01)
  *H04W 4/22* (2009.01)

(52) U.S. Cl.
  CPC .................................... *H04W 4/22* (2013.01)

(58) Field of Classification Search
  USPC .............. 370/230–401; 455/401–522; 709/207–228; 379/37–45
  See application file for complete search history.

(56) References Cited

U.S. PATENT DOCUMENTS

| | | | | |
|---|---|---|---|---|
| 6,128,481 A * | 10/2000 | Houde et al. | | 455/404.2 |
| 7,315,734 B2 * | 1/2008 | Friedenfelds et al. | | 455/404.1 |
| 7,940,896 B2 * | 5/2011 | Prozeniuk | | H04M 11/04 379/37 |
| 8,254,877 B2 * | 8/2012 | Edge et al. | | 455/404.2 |
| 8,289,958 B1 * | 10/2012 | Narayanan | | 370/389 |
| 8,396,445 B2 | 3/2013 | Crawford et al. | | |
| 8,442,481 B2 * | 5/2013 | Maier | | H04W 64/00 455/404.1 |
| 8,447,267 B2 * | 5/2013 | Ray | | H04M 3/5116 370/328 |
| 8,483,685 B2 * | 7/2013 | Ghai | | H04L 45/38 370/353 |
| 8,516,122 B2 * | 8/2013 | Piett | | H04W 4/22 709/223 |
| 8,731,143 B2 * | 5/2014 | Keller | | H04M 3/42365 379/39 |
| 8,755,765 B2 * | 6/2014 | Bakker et al. | | 455/404.1 |
| 8,908,837 B2 * | 12/2014 | O'Conor | | H04M 3/5116 379/45 |
| 8,965,326 B2 * | 2/2015 | Michaelis | | H04W 76/007 455/404.1 |
| 9,131,361 B2 * | 9/2015 | Ray | | H04L 51/066 |
| 9,137,383 B2 * | 9/2015 | Estrada | | H04M 3/5116 |
| 9,148,522 B2 * | 9/2015 | Russell | | H04M 15/66 |
| 9,148,771 B2 * | 9/2015 | Zentner | | |

(Continued)

Primary Examiner — Man Phan (57) ABSTRACT

An Internet Protocol (IP) router provides location information for an emergency communication session. The IP router receives a base station identifier associated with a request for the emergency communication session. The IP router selects a Public Safety Answering Point (PSAP) based on the base station identifier. The IP router determines a PSAP type and a network type for the selected PSAP. The IP router transfers a location request for delivery to a location control system and receives location information transferred from the location control system. The IP router converts the location information into PSAP signaling used by the selected PSAP based on the PSAP and network type. The IP router transfers the converted location information for delivery to the selected PSAP.

12 Claims, 6 Drawing Sheets

(56) References Cited

U.S. PATENT DOCUMENTS

| | | | |
|---|---|---|---|
| 9,391,879 B2* | 7/2016 | Kamboh | H04L 45/3065 |
| 2007/0003024 A1* | 1/2007 | Olivier et al. | 379/45 |
| 2007/0060097 A1* | 3/2007 | Edge et al. | 455/404.1 |
| 2011/0201299 A1* | 8/2011 | Kamdar | 455/404.1 |
| 2012/0320912 A1* | 12/2012 | Estrada et al. | 370/389 |
| 2013/0029634 A1 | 1/2013 | Li | |
| 2013/0315384 A1* | 11/2013 | Coster et al. | 379/45 |
| 2015/0031324 A1* | 1/2015 | Zentner et al. | 455/404.2 |

\* cited by examiner

CONVERTING LOCATION INFORMATION INTO PUBLIC SAFETY ANSWERING POINT (PSAP) SIGNALING

TECHNICAL BACKGROUND

Emergency calls, such as 911 calls, may require the location of the caller. Location information allows for the emergency call to be routed to the proper Public Safety Answering Point (PSAP). Landline telephones are tied to a location and the location is associated with the telephone number. For example, a person's home telephone number may be associated with his or her home address for billing purposes. When an emergency call is initiated from the person's landline, the call is routed to the proper PSAP based on the address associated with the calling telephone number. Increasingly, emergency calls are being placed on mobile devices that are not tied to a single location. Furthermore, advances in technology allow users to transmit text messages, images, video, and data, in addition to making voice calls.

In order to provide enhanced services such as text messaging, images, video and data, the emergency communication system is transitioning from the current circuit switched network to an Internet Protocol (IP) enabled network. However, during the transition, not all services may be available at all PSAPs. Additionally, a call routed to the Emergency Services IP network (ESInet) may be routed back to a legacy (non-IP) PSAP. In this situation, the caller's location included in the call request may not be able to be passed in the call to the legacy PSAP.

Overview

An Internet Protocol (IP) router provides location information for an emergency communication session. The IP router receives a base station identifier associated with a request for the emergency communication session. The IP router selects a Public Safety Answering Point (PSAP) based on the base station identifier. The IP router determines a PSAP type and a network type for the selected PSAP. The IP router transfers a location request for delivery to a location control system and receives location information transferred from the location control system. The IP router converts the location information into PSAP signaling used by the selected PSAP based on the PSAP and network type. The IP router transfers the converted location information for delivery to the selected PSAP.

DETAILED DESCRIPTION

Figure 1:
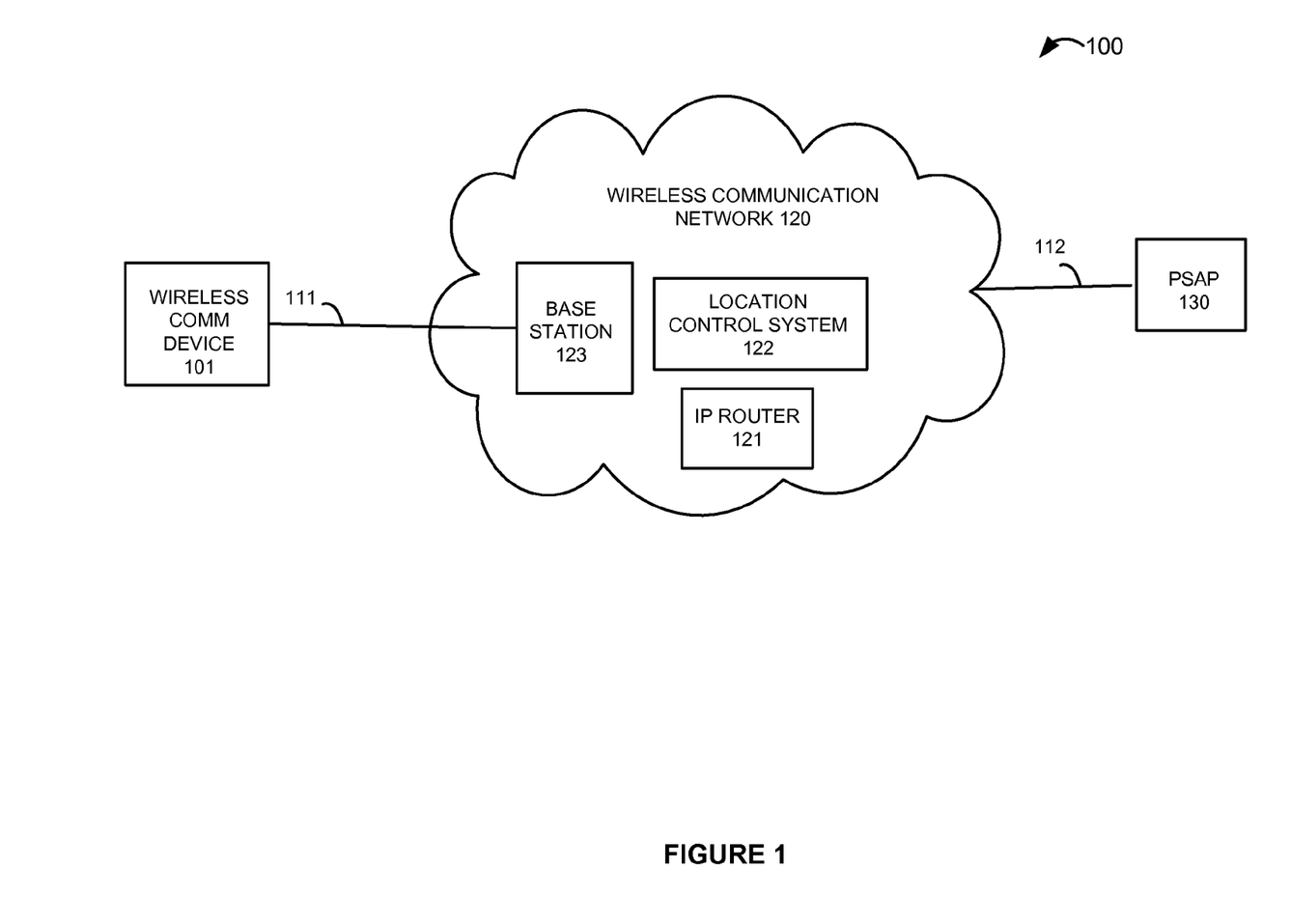
FIG. 1 illustrates a communication system to convert location information into PSAP signaling.

FIG. 1 illustrates communication system 100 to convert location information into PSAP signaling. Communication system 100 includes wireless communication device 101, wireless communication network 120, and PSAP 130. Wireless communication network 120 includes base station 123, IP router 121, and location control system 122. Wireless communication device 101 and wireless communication network 120 communicate over wireless communication link 111. Wireless communication network 120 and PSAP 130 communication over communication link 112.

Examples of wireless communication device 101 include wireless communication devices such as a telephone, cellular phone, mobile phone, smartphone, Personal Digital Assistant (PDA), laptop, computer, e-book, eReader, mobile Internet appliance, or some other wireless communication device with a wireless transceiver—including combinations thereof. Examples of base station 123 include a base station, eNodeB, femtocell, access point base station, Internet access node, telephony service node, wireless data access point, wireless hotspot, or some other wireless communication system—including combinations thereof. An example of IP router 121 includes an Internet Protocol Selective Router (IPSR).

In operation, IP router 121 receives a base station identifier associated with a request for an emergency communication session and selects a PSAP based on the base station identifier. Examples, of an emergency communication session include a wireless 911 call, a 911 VoIP call, or a 3GPP standard VoLTE emergency call. IP router 121 determines a PSAP type and a network type for the selected PSAP. Examples of PSAP types include i3, non-i3, and Legacy (non-IP). Network types include Public Switched Telephone Network (PSTN) or IP network. IP router 121 transfers a location request for delivery to a location control system and receives location information transferred from the location control system. Examples of location information include a Uniform Resource Identifier (URI), base station identifier, street address, or Global Positioning System (GPS) coordinates. IP router 121 converts the location information into PSAP signaling used by the selected PSAP, based on the PSAP and network type. IP router 121 transfers the converted location information for delivery to the selected PSAP.

Figure 2:
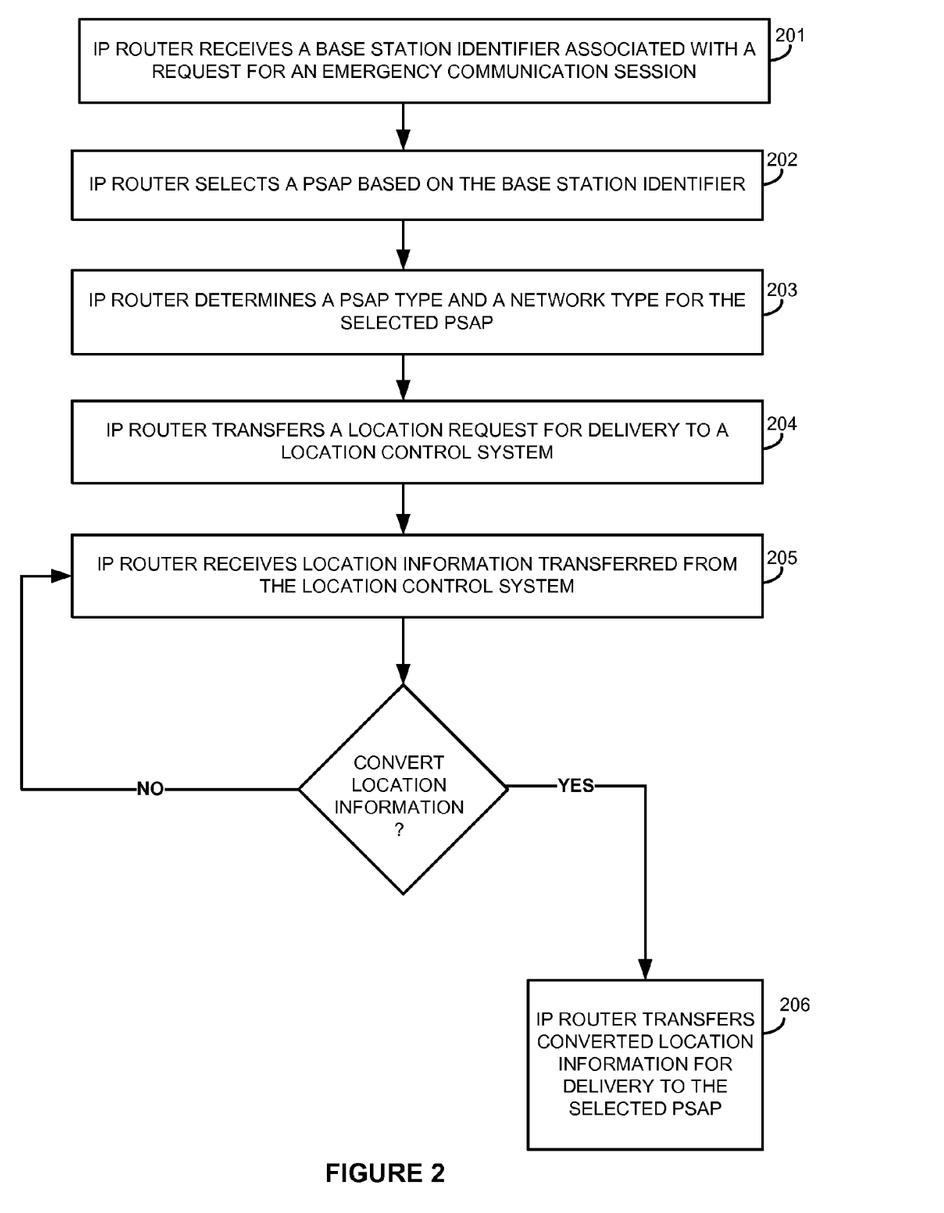
FIG. 2 illustrates the operation of the communication system to convert location information into PSAP signaling.

FIG. 2 illustrates the operation of communication system 100 to convert location information into PSAP signaling. IP router 121 receives a base station identifier associated with a request for an emergency communication session (201). IP router selects a PSAP based on the base station identifier (202). For example, IP router 121 may determine the geographic location of the base station associated with the emergency communication session in order to select a PSAP. In other examples, IP router 121 may use a lookup table to determine the base station location based on the base station identifier.

After selecting a PSAP, IP router 121 determines a PSAP type and a network type for the selected PSAP (203). IP router 121 may use a lookup table to determine the PSAP and network type. In other examples, IP router 121 may query the selected PSAP for the PSAP type and network type. IP router 121 transfers a location request for delivery to a location control system (204). IP router 121 receives location information transferred from the location control system (205). IP router 121 converts the location information into PSAP signaling used by the selected PSAP, based on the PSAP and network type. IP router 121 transfers the converted location information for delivery to the selected PSAP (206).

Figure 3:
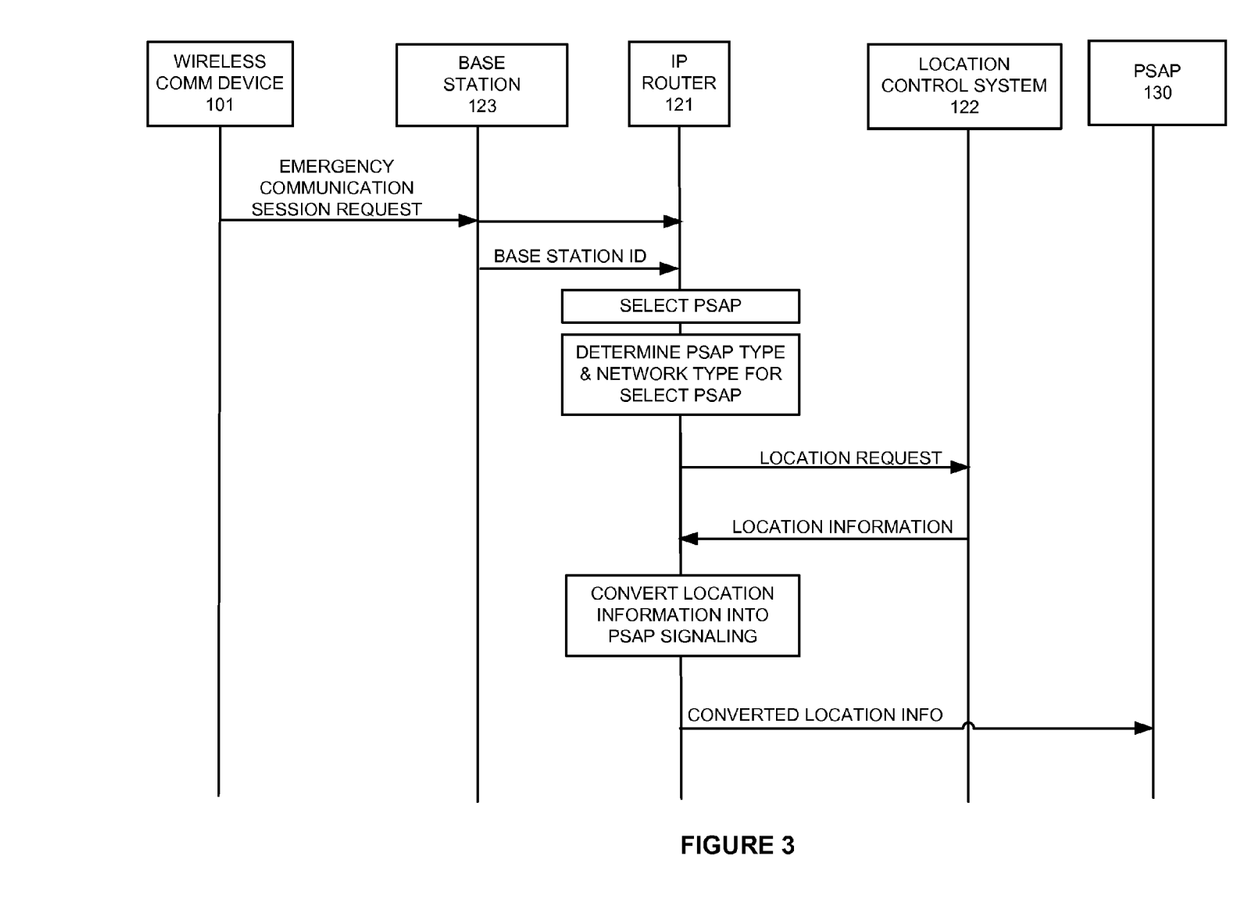
FIG. 3 illustrates the operation of the communication system to convert location information into PSAP signaling.

FIG. 3 illustrates the operation of communication system 100 to convert location information into PSAP signaling. IP router 121 receives a base station identifier associated with a request for an emergency communication session and selects a PSAP based on the base station identifier. IP router 121 determines a PSAP type and a network type for the selected PSAP. IP router 121 transfers a location request for delivery to a location control system and receives location information transferred from the location control system. IP router 121 converts the location information into PSAP signaling used by the selected PSAP, based on the PSAP and network type. IP router 121 transfers the converted location information for delivery to the selected PSAP.

Figure 4:
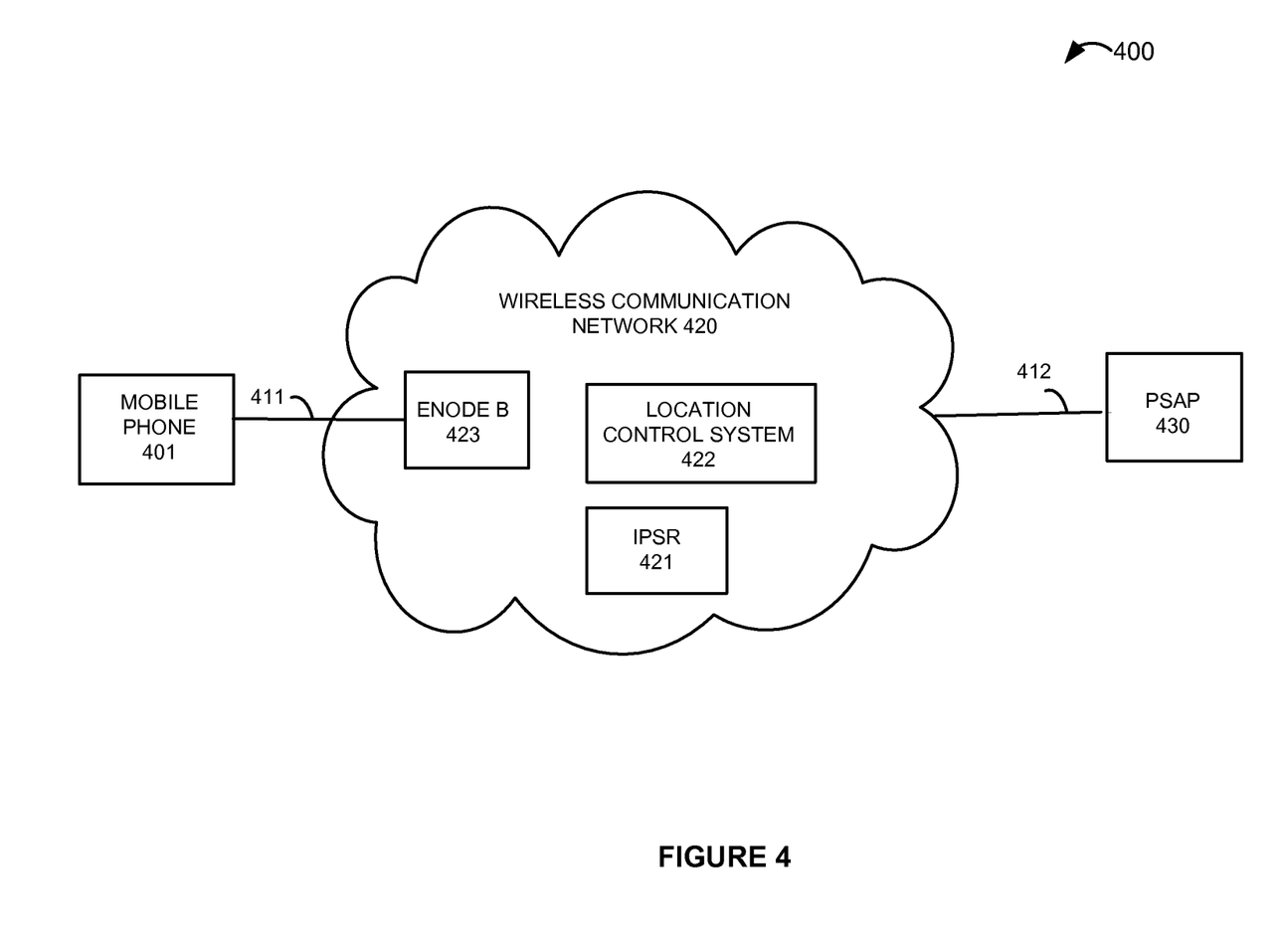
FIG. 4 illustrates a communication system to convert location information into PSAP signaling.

FIG. 4 illustrates communication system 400 to convert location information into PSAP signaling. Wireless communication system 400 is an example of wireless communication system 100, although wireless communication system 100 may use alternative configurations. Wireless communication system 400 comprises mobile phone 401, wireless communication network 420, and PSAP 430. Wireless communication network 420 includes eNodeB 423, location control system 422, and Internet Protocol Selective Router (IPSR) 421. Mobile phone 401 communicates with wireless communication network 420 over wireless communication link 411. Wireless communication network 420 communicates with PSAP 430 over communication link 412.

In operation, IPSR 421 receives a base station identifier for eNodeB 423, which handles the emergency communication session request from mobile phone 401. IPSR 421 selects PSAP 430 based on the base station identifier. IPSR 421 determines PSAP 430 has a legacy PSAP type and a Public Switched Telephone network (PSTN) network type. IPSR 421 transfers a location request for delivery to location control system 422 and receives location information transferred from location control system 422. IPSR 421 converts the location information into information that can be transferred to PSAP 430 via a caller Identification (ID) field value over the PSTN. In some examples, IPSR 421 converts the received street address location information into information that may be included in a caller ID field. In other examples, IPSR 421 converts received Global Positioning System (GPS) coordinates location information into a caller ID field value. In yet other examples, IPSR 421 may receive and convert the base station identifier into a caller ID field value.

In another example, PSAP 430 may be a non-i3 IP PSAP with an IP network type. In this example, IPSR 421 converts the location information into information that can be transferred to PSAP 430 via a Session Initiation Protocol (SIP) message over the IP network. IPSR 421 may include the received street address location information in a SIP message header. In other examples, IPSR 421 may include the received Global Positioning System (GPS) coordinates location information into a SIP message header. In yet other examples, IPSR 421 may include the base station identifier into a SIP message header.

Figure 5:
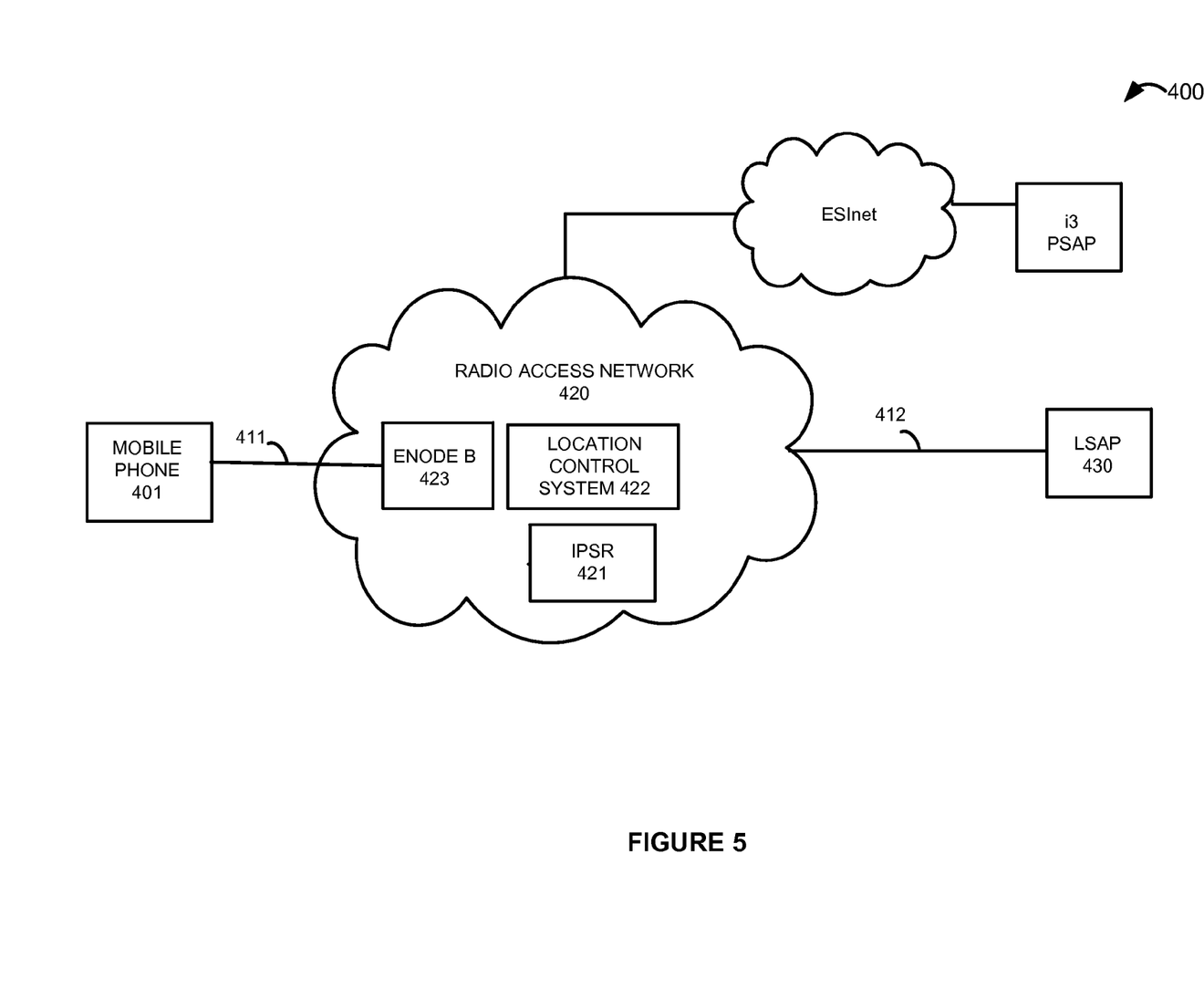
FIG. 5 illustrates a communication system to convert location information into PSAP signaling

FIG. 5 illustrates communication system 400 and provides additional detail. Included, but not numbered are Emergency Service IP network (ESInet) and i3 PSAP. In some examples, an emergency call may initially be routed to an i3 or non-i3 (but IP capable) PSAP. However, the emergency call may need to be rerouted to another PSAP that may be a legacy (non-IP) PSAP. This may be because all emergency calls are initially routed through the ESInet and the ESInet determines how to route the call. Alternatively, the user of the mobile device may be traveling while making the emergency call, and may be located closer to a legacy PSAP after the emergency call is initially routed.

When an emergency communication session is routed through the ESInet, the caller's location information may be received with the emergency call request. However, when the call is rerouted to another non-IP PSAP, the location information may not be able to be passed in the call. Instead of passing a proxy or pseudo Automatic Number Identification (ANI) to the PSAP, the IPSR can convert the location information into PSAP signaling compatible with the other PSAP.

Figure 6:
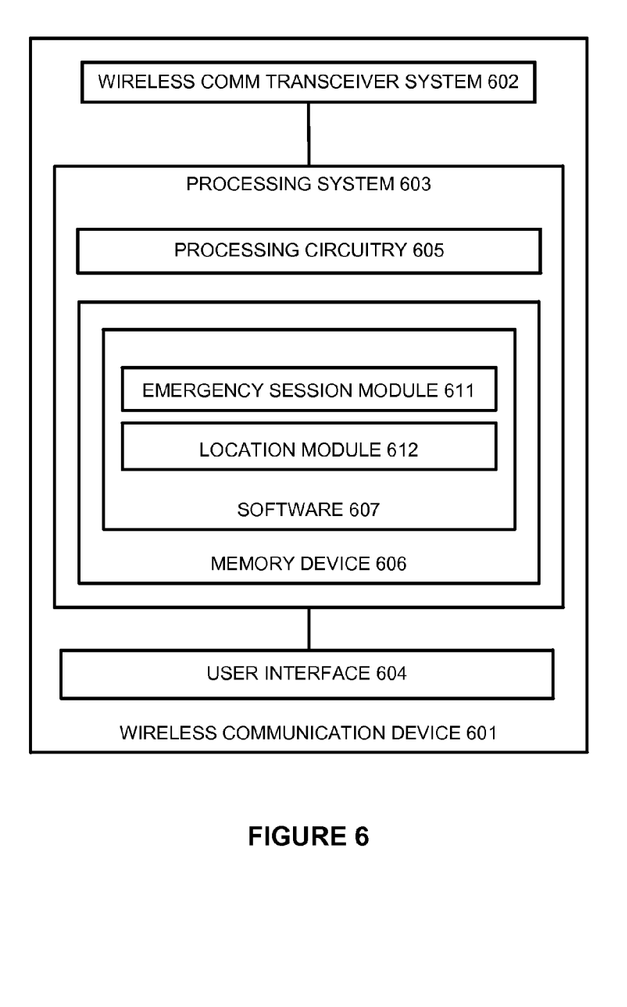
FIG. 6 illustrates a wireless communication device.

FIG. 6 illustrates wireless communication device 601. Wireless communication device 601 is an example of wireless communication device 101 and mobile phone 401, although wireless communication device 101 and mobile phone 401 could use alternative configurations. Wireless communication device 601 comprises wireless communication transceiver system 602, processing system 603, and user interface 604. Processing system 603 is linked to wireless communication transceiver system 602 and user interface 604. Processing system 603 includes processing circuitry 605 and memory device 606 that stores operating software 607. Software 607 comprises emergency session module 611 and location module 612. Wireless communication device 601 may include other well-known components such as a battery and enclosure that are not shown for clarity. Wireless communication device 601 may be a telephone, cellular phone, mobile phone, smartphone, personal digital assistant (PDA), computer, laptop, tablet, e-book, mobile Internet appliance, media player, game console, wireless network interface card, or some other wireless communication apparatus—including combinations thereof.

Wireless communication transceiver system 602 comprises RF communication circuitry and an antenna. The RF communication circuitry typically includes an amplifier, filter, RF modulator, and signal processing circuitry. Wireless communication transceiver system 602 may also include a memory device, software, processing circuitry, or some other communication device. Wireless communication transceiver system 602 may use various communication formats, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format—including combinations thereof.

User interface 604 comprises components that interact with a user to receive user inputs and to present media and/or information. User interface 604 may include a speaker, microphone, buttons, lights, display screen, touch screen, touch pad, scroll wheel, communication port, or some other user input/output apparatus—including combinations thereof. User interface 604 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Processing circuitry 605 is typically mounted on a circuit board that may also hold memory device 606, portions of wireless communication transceiver system 602, and user interface 604. Operating software 607 comprises computer programs, firmware, or some other form of machine-readable processing instructions. Operating software 607 may include an operating system, utilities, drivers, network interfaces, applications, or some other type of software. When executed by processing circuitry 605, operating software 607 directs processing system 603 to operate user equipment 601 as described herein.

When executed, software 607 directs processing system 603 to operate as described herein to convert location information into PSAP signaling. In particular, emergency session module 611 directs processing system 603 to process the emergency communication session request to establish the emergency communication session. Location module 612 directs processing system 603 to determine the location of the wireless communication device. Location information may be transferred with the emergency communication session request or may be transferred in response to a query. In some examples, the location of the wireless communication device may be determined by other components of the wireless communication system. For example, the IP router may determine the wireless communication device's location based on the base station identifier. In other examples, the base station may determine the wireless communication device's location and include the location information with the emergency communication session request.

Figure 7:
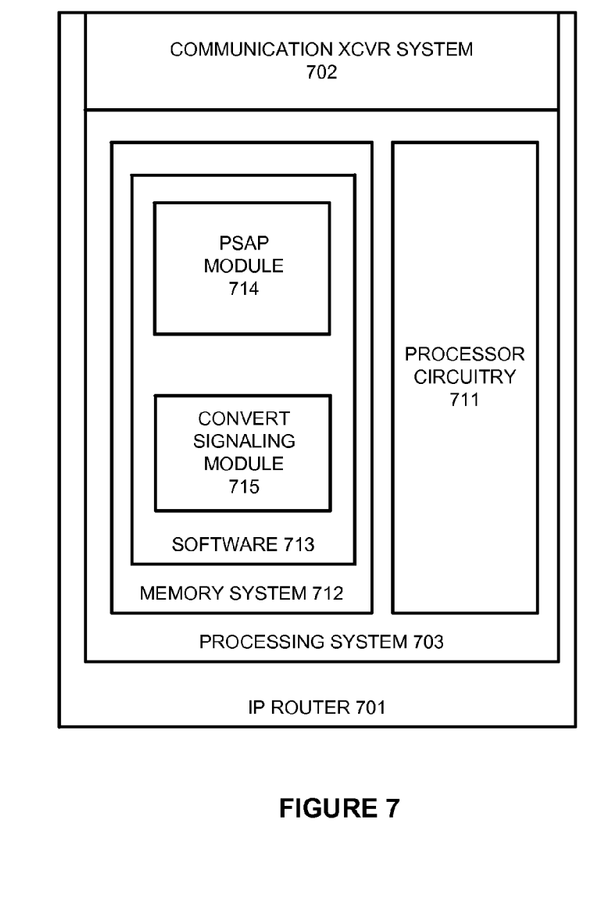
FIG. 7 illustrates an IP router

FIG. 7 illustrates IP Router 701. IP Router 701 is an example of IP Router 121 and IPSR 421, although these systems may use alternative configurations and operations. IP Router 701 comprises communication transceiver system 702 and processing system 703. Processing system 703 includes processing circuitry 711 and memory 712 that stores software 713. Software 713 comprises software modules 714-715.

Communication transceiver system 702 comprises components that communicate over communication links such as network cards, ports, RF transceivers, processing circuitry and software, or some other communication components. Communication transceiver system 702 may be configured to communicate over metallic, wireless, or optical links. Communication transceiver system 702 may be configured to use TDM, IP, Ethernet, optical networking, wireless protocols, communication signaling, or some other communication format—including combinations thereof. Communication transceiver system 702 receives requests for emergency communication sessions. Communication transceiver system 702 may also receive a lookup table of base station identifiers and location. In some examples, communication transceiver system 702 receives a lookup table of PSAPs that includes PSAP type and network type information. Communication transceiver system 702 also receives location information from location control systems.

Processor circuitry 711 comprises microprocessor and other circuitry that retrieves and executes operating software 713 from memory system 712. Processor circuitry 711 may comprise a single device or could be distributed across multiple devices—including devices in different geographic areas. Processor circuitry 711 may be embedded in various types of equipment. Examples of processor circuitry 711 include central processing units, application specific processors, logic devices, and/or any type of computer processing devices—including combinations thereof. Processor circuitry 711 processes the emergency communication session request to initiate an emergency communication session.

Memory system 712 comprises a non-transitory computer readable storage medium readable by processing system 703 and capable of storing software 713, such as a disk drive, flash drive, data storage circuitry, or some other hardware memory apparatus—including combinations thereof. Memory system 712 can include volatile and non-volatile, removable and non-removable media implemented in any method or technology for storage of information, such as computer readable instructions, data structures, program modules, or other data—including combinations thereof. Memory system 712 may comprise a single device or could be distributed across multiple devices—including devices in different geographic areas. Memory system 712 may be embedded in various types of equipment. In some examples, a computer apparatus could comprise memory system 712 and software 713.

Software 713 comprises computer programs, firmware, or some other form of machine-readable processing instructions. Software 713 may include an operating system, utilities, drivers, network interfaces, applications, or some other type of software. In this example, software 713 comprises PSAP session module 714 and convert signaling module 715, although software 713 could have alternative configurations in other examples.

Software 713 may be implemented in program instructions and may be executed by processing system 703. Software 713 may include additional processes, programs, or components, such as operating system software, database software, or application software—including combinations thereof. Software 713 may also comprise firmware or some other form of machine-readable processing instructions executable by processing system 703.

When executed, software 713 directs processing system 703 to operate as described herein to convert location information into PSAP signaling. In particular, PSAP module 714 directs processing system 703 to process the base station identifier and select a PSAP. PSAP module 714 further directs processing system 703 to identify a PSAP type and a network type for the selected PSAP. Convert signaling module 715 directs processing system 703 to convert location information into PSAP signaling used by the selected PSAP.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Base station 123 comprises RF communication circuitry and an antenna. The RF communication circuitry typically includes an amplifier, filter, RF modulator, and signal processing circuitry. Base station 123 may also comprise a router, server, memory device, software, processing circuitry, cabling, power supply, network communication interface, structural support, or some other communication apparatus. Base station 123 could be a base station, eNodeB, Internet access node, telephony service node, wireless data access point, or some other wireless communication system—including combinations thereof.

IP router 121 comprises a computer system and communication interface. IP router 122 may also include other components such as a router, server, data storage system, and power supply. IP router 121 may reside in a single device or may be distributed across multiple devices. IP router 121 could be a mobile switching center, network gateway system, Internet access node, application server, service node, or some other communication system—including combinations thereof. IP router 121 is shown as part of wireless communication network 120, but could also be located outside of wireless communication system 120.

Location control system 122 comprises a computer system and communication interface. Location control system 122 may also include other components such as a router, server, data storage system, and power supply. Location control system 122 may reside in a single device or may be distributed across multiple devices. Location control system 122 may include the evolved Serving Mobile Location Center (eSMLC), Gateway Mobile Location Center (GMLC), and the Location Retrieval Function (LRF) components.

Wireless communication network 120 comprises network elements that provide communications services to wireless communication device 101 through base station 123. Wireless communication network 120 may comprise switches, wireless access nodes, Internet routers, network gateways, application servers, computer systems, communication links, or some other type of communication equipment— including combinations thereof.

Wireless communication link 111 uses the air or space as the transport media. Wireless communication link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 112 uses metal, glass, air, space, or some other material as the transport media. Communication link 112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 112 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating an Internet Protocol (IP) router to provide location information for an emergency communication session, the method comprising:
    receiving a base station identifier associated with a request for the emergency communication session;
    selecting a Public Safety Answering Point (PSAP) based on the base station identifier;
    determining an Internet Protocol (IP) PSAP type and an IP network type for the selected PSAP;
    transferring a location request for delivery to a location control system;
    receiving location information transferred from the location control system;
    including the location information in a Session Initiation Protocol (SIP) message used by the selected PSAP based on the IP PSAP type and the IP network type; and
    transferring the converted location information for delivery to the selected PSAP.

2. The method of claim 1 wherein the IP PSAP type comprises an i3 IP PSAP.

3. The method of claim 1 wherein the IP PSAP type comprises a non-i3 IP PSAP.

4. The method of claim 1 wherein the location information comprises Global Positioning System (GPS) coordinates of a wireless communication device associated with the emergency communication session.

5. The method of claim 1 wherein the location information comprises a street address of a wireless communication device associated with the emergency communication session.

6. The method of claim 1 wherein the location information comprises the base station identifier.

7. An Internet Protocol (IP) router to provide location information for an emergency communication session comprising:
    a communication interface configured to receive a base station identifier associated with a request for the emergency communication session;
    a processing system configured to select a Public Safety Answering Point (PSAP) based on the base station identifier;
    the processing system configured to determine an Internet Protocol (IP) PSAP type and an IP network type for the selected PSAP;
    the communication interface configured to transfer a location request for delivery to a location control system, and to receive location information transferred from the location control system;
    the processing system configured to include the location information in a Session Initiation Protocol (SIP) message used by the selected PSAP based on the IP PSAP type and the IP network type; and
    the communication interface configured to transfer the converted location information for delivery to the selected PSAP.

8. The IP router of claim 7 wherein the IP PSAP type comprises an i3 IP PSAP.

9. The IP router of claim 7 wherein the IP PSAP type comprises a non-i3 IP PSAP.

10. The IP router of claim 7 wherein the location information comprises Global Positioning System (GPS) coordinates of a wireless communication device associated with the emergency communication session.

11. The IP router of claim 7 wherein the location information comprises a street address of a wireless communication device associated with the emergency communication session.

12. The IP router of claim 7 wherein the location information comprises the base station identifier.

* * * * *